US009390685B2

(12) United States Patent
Kadota

(10) Patent No.: US 9,390,685 B2
(45) Date of Patent: Jul. 12, 2016

(54) SEMICONDUCTOR DEVICE, DISPLAY DEVICE, AND SIGNAL LOADING METHOD

(71) Applicant: LAPIS SEMICONDUCTOR CO., LTD., Yokohama-Shi, Kanagawa (JP)

(72) Inventor: Daisuke Kadota, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 109 days.

(21) Appl. No.: 14/306,766

(22) Filed: Jun. 17, 2014

(65) Prior Publication Data

US 2014/0375617 A1 Dec. 25, 2014

(30) Foreign Application Priority Data

Jun. 20, 2013 (JP) ................................ 2013-129918

(51) Int. Cl.
*G06F 3/038* (2013.01)
*G09G 5/18* (2006.01)
*G09G 5/00* (2006.01)
*G09G 3/36* (2006.01)

(52) U.S. Cl.
CPC .................. *G09G 5/18* (2013.01); *G09G 5/006* (2013.01); *G09G 5/008* (2013.01); *G09G 3/36* (2013.01); *G09G 2370/08* (2013.01); *G09G 2370/14* (2013.01)

(58) Field of Classification Search
CPC combination set(s) only.
See application file for complete search history.

(56) References Cited

U.S. PATENT DOCUMENTS 4,979,194 A * 12/1990 Kawano ................. H03K 5/156 377/55
2005/0088432 A1* 4/2005 Miyazawa ........... G09G 3/3648 345/204
2007/0013641 A1* 1/2007 Kim ..................... G09G 3/3688 345/100
2009/0146935 A1* 6/2009 Song .................... G09G 3/3611 345/87
2009/0303224 A1* 12/2009 Yoshida ............... G09G 3/3648 345/213
2013/0103994 A1* 4/2013 Tekumalla ..... G01R 31/318594 714/726

FOREIGN PATENT DOCUMENTS

JP 2012-044256 3/2012

* cited by examiner

*Primary Examiner* — Jason Olson
*Assistant Examiner* — Sosina Abebe
(74) *Attorney, Agent, or Firm* — Volentine & Whitt, PLLC

(57) ABSTRACT

An input signal is segmented by a first data latch into 2 bit segments according to rising and falling edges of a clock signal clk, and latched. When the input signal is an RSDS signal, 2 sets worth of 2 bit data are latched according to rising and falling edges of a clock signal clkx2, using a first output section, a first data holding section, and a second output section. When the input signal is a mini-LVDS signal, 4 clock cycles worth of data are held according to the rising and falling edges of the clock signal clkx2 using the first data holding section and the second output section. One set's worth of 8 bit data is then latched according to a rising edge of a clock signal clkx4 using the first output section, a third output section, a fourth output section, and a fifth output section.

14 Claims, 11 Drawing Sheets

SEMICONDUCTOR DEVICE, DISPLAY DEVICE, AND SIGNAL LOADING METHOD

CROSS-REFERENCE TO RELATED APPLICATION

This application claims priority under 35 USC 119 from Japanese Patent Application No. 2013-129918, filed on Jun. 20, 2013, the disclosure of which is incorporated by reference herein.

BACKGROUND OF THE INVENTION

1. Field of the Invention

The present invention relates to a semiconductor device, a display device, and a signal loading method.

2. Description of the Related Art

ICs are generally provided with an interface to load input signals. Such ICs include, for example, drive ICs employed to display an image on a display panel such as a liquid crystal display. Drive ICs receives, from a timing controller semiconductor device, a data signal and a control signal for displaying an image on a display panel, and outputs the signal to a signal line of the display panel.

As an example of a drive IC, Japanese Patent Application Laid-Open (JP-A) No. 2012-44256 describes a semiconductor circuit that is capable of loading, according to signal input format, signals input using different formats, a single-ended input format and a different differential input format.

In general, input methods for data (information) input to a drive IC from a timing controller semiconductor device mainly employs differential input formats. For example, reduced Swing Differential Signaling (RSDS) and mini-Low Voltage Differential Signaling (mini-LVDS) are examples of differential input method standards.

Recently, greater speed, as well as compatibility with mini-LVDS interfaces that are faster than RSDS interfaces, is being demanded of IC interfaces.

The technology described in JP-A No. 2012-44256 is capable of accommodating two formats, a single input format and a differential input format, but is unable to accommodate different differential input formats (such as RSDS and mini-LVDS). Ordinary conventional drives ICs do not include functionality for inputs of different differential input formats.

There is consequently a need to redesign drive ICs for each type of signal output from a timing controller, incurring a lengthy development process and redesign costs. Further, providing a drive IC with circuits corresponding to both of the different differential input signal formats and using a select signal, for example, to select one or other of the circuits for use might be considered. However, such a solution leads to the unused circuit becoming redundant.

SUMMARY OF THE INVENTION

The present invention provides a semiconductor device, a display device, and a loading method that enables different differential input formats to be loaded whilst suppressing an increase in circuit scale.

A first aspect of the present invention is a semiconductor device including: a clock signal supply section that supplies plural clock signals; an input terminal that is input with a first differential signal or a second differential signal; an input data controller that includes a first output section outputting input data, that has been input through the input terminal according to a clock signal supplied from the clock signal supply section, and that controls loading of the input data; a first output terminal that is connected to the first output section and that outputs a signal corresponding to the first differential signal; a second output terminal that is connected to the first output terminal and that outputs a signal corresponding to the second differential signal; and a selector that, based on a switching signal from a clock switching signal supply section, selects a clock signal corresponding to the first differential signal or the second differential signal from out of plural signals supplied from the clock signal supply section, and that supplies the selected clock signal to the first output section.

Another aspect of the present invention is a display device including: a display panel; a drive IC that includes the semiconductor device according to the first aspect, and that outputs to the display panel a signal generated based on input data loaded by the semiconductor device; and a timing controller that instructs the semiconductor device regarding input data loading.

Still another aspect of the present invention is a signal loading method for a semiconductor device including a clock signal supply section that supplies a first clock signal and a second clock signal, an input terminal that is input with a first differential signal or a second differential signal, an input data controller that includes a first output section outputting input data, that has been input through the input terminal according to a clock signal supplied from the clock signal supply section and that controls loading of the input data, a first output terminal that is connected to the first output section and that outputs a signal corresponding to the first differential signal, a second output terminal that is connected to the first output terminal and that outputs a signal corresponding to the second differential signal, and a selector that based on a switching signal from a clock switching signal supply section selects a clock signal corresponding to the first differential signal or the second differential signal from out of the first clock signal and the second clock signal supplied from the clock signal supply section, and supplies the selected clock signal to the first output section, a second output section that, according to the first clock signal supplied, outputs a signal corresponding to the second differential signal to a second data holding section supplied with the first clock signal, and outputs to a third output terminal a signal corresponding to the first differential signal, and a third output section that is connected to the second data holding section and that outputs to a fourth output terminal a signal corresponding to the second differential signal according to the second clock signal, the loading method comprising: when the first differential signal has been input to the input terminal, selecting, by the selector, the first clock signal corresponding to the first differential signal, and supplying the first clock signal to the first output section; outputting, by the first output section, the input data from the first output terminal according to the first clock signal; and outputting, by the second output section, according to the first clock signal, a signal corresponding to the second differential signal to the second data holding section that is supplied with the first clock signal, and a signal corresponding to the first differential signal from a third output terminal; and when the second differential signal has been input to the input terminal, selecting, by the selector, the second clock signal corresponding to the second differential signal, and supplying the second clock signal to the first output section; outputting, by the first output section, the input data from the third output terminal according to the second clock signal; and outputting, by the third output section, a signal corresponding to the second differential signal from the fourth output terminal according to the second clock signal.

The above aspects of the present invention may provide a semiconductor device, display device, and loading method that may be capable of loading signals with different differential input formats whilst suppressing an increase in circuit scale.

BRIEF DESCRIPTION OF THE DRAWINGS

Exemplary embodiments of the present invention will be described in detail based on the following figures, wherein.

DETAILED DESCRIPTION OF THE INVENTION

Detailed explanation follows regarding an exemplary embodiment, with reference to the drawings. Explanation first outlines the present exemplary embodiment before proceeding on to specifics of the exemplary embodiment.

Figure 1:
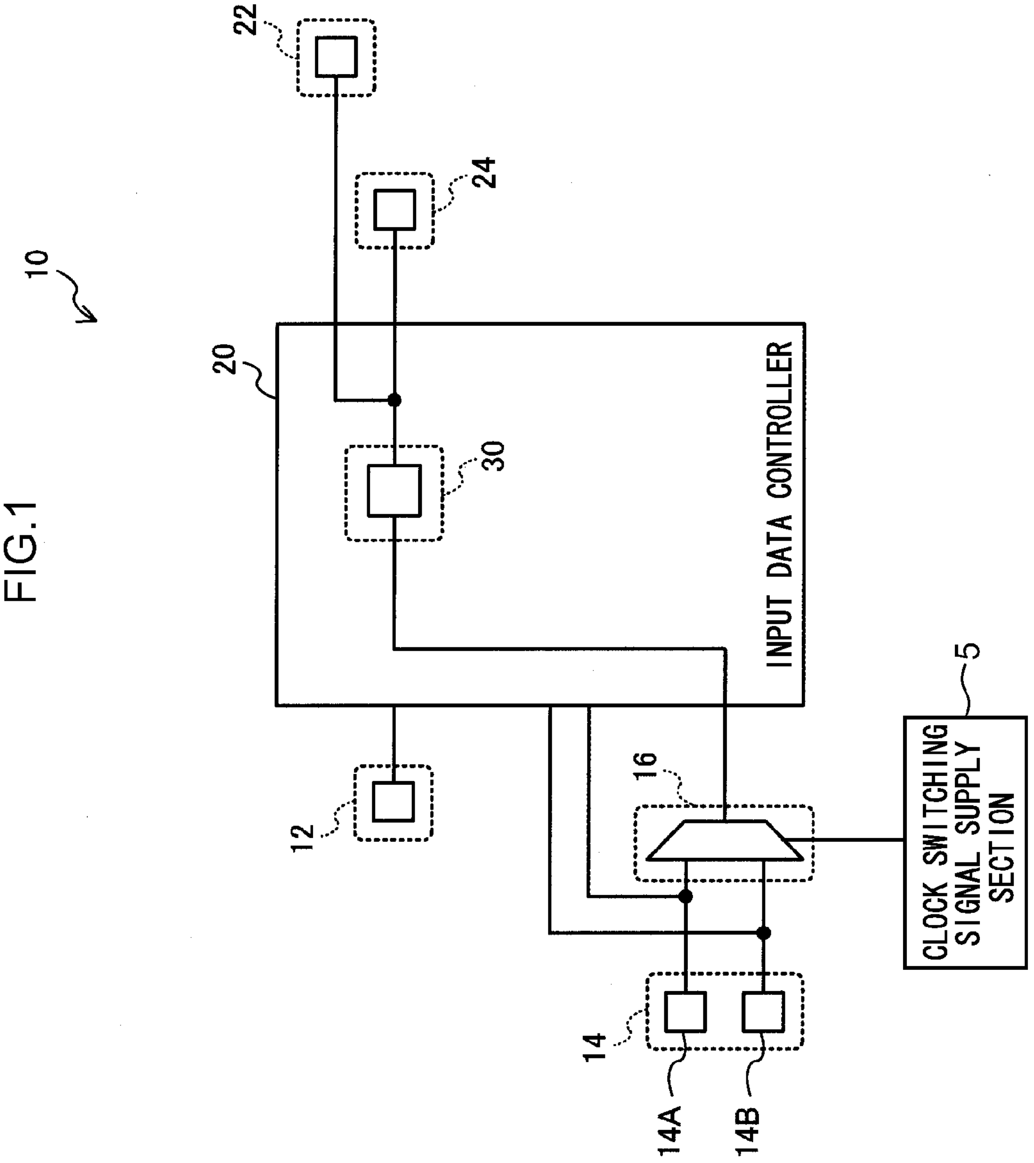
FIG. 1 is a schematic diagram illustrating a semiconductor device of an exemplary embodiment.

FIG. 1 is a schematic diagram of a semiconductor device showing only relevant portions of the present exemplary embodiment. Note that a semiconductor device 10 illustrated in FIG. 1 outlines the concept of the semiconductor device 10 of the present exemplary embodiment. The semiconductor device 10 of the present exemplary embodiment load signals with different differential input formats, and output signals to another circuit (such as an internal circuit) mounted to an IC, or the like, that incorporates the semiconductor device 10. Namely, the semiconductor device 10 functions as an interface that accommodates input of different respective differential input formats.

As illustrated in FIG. 1, the semiconductor device 10 includes an input terminal 12, a clock signal supply section 14, a selector 16, an input data controller 20, a first output terminal 22, and a second output terminal 24. The input data controller 20 is moreover equipped with a first output section 30.

The clock signal supply section 14 supplies the input data controller 20 with clock signals at different frequencies. The clock signal supply section 14 is accordingly equipped with a clock signal supply section 14A and a clock signal supply section 14B that respectively supply clock signals at different frequencies. For example, the clock signal supply section 14A supplies the input data controller 20 with a clock signal that is a specific clock signal frequency-divided by 2 (with a frequency of 1/2×the specific clock signal). The clock signal supply section 14B supplies the input data controller 20 with a clock signal that is the specific clock signal frequency-divided by 4 (with a frequency of 1/4×the specific clock signal). These clock signals are supplied directly to the input data controller 20, and are supplied through the selector 16 to the first output section 30 of the input data controller 20.

The selector 16 selects either one of the clock signals supplied from the clock signal supply section 14 according to a clock switching signal supplied from a clock switching signal supply section 5, and outputs the selected signal to the first output section 30. Note that, in the present exemplary embodiment, the clock switching signal supply section 5 is provided separately to the semiconductor device 10, however the clock switching signal supply section 5 may be provided to the semiconductor device 10 itself.

In the semiconductor device 10 of the present exemplary embodiment, a differential input format input signal is input to the first output section 30 through the input terminal 12. Signals of different input formats are input to the input terminal 12, as described above.

The first output section 30 of the input data controller 20 loads the input signal input from the input terminal 12 according to the clock signal supplied through the selector 16, and outputs the loaded signal to outside the input data controller 20 (to a later stage circuit). The clock signals supplied to the first output section 30 are signals of different frequencies, and so a timing at which the first output section 30 loads the input signal input from the input terminal 12 varies according to the supplied clock signal.

In the semiconductor device 10 of the present exemplary embodiment, the signal loaded by the first output section 30 according to the clock signal supplied from the clock signal supply section 14A is output to outside the semiconductor device 10 (to a later stage circuit) through the first output terminal 22. In the semiconductor device 10, the signal loaded by the first output section 30 according to the clock signal supplied from the clock signal supply section 14B is output to a later stage circuit of the semiconductor device 10 through the second output terminal 24.

Figure 2:
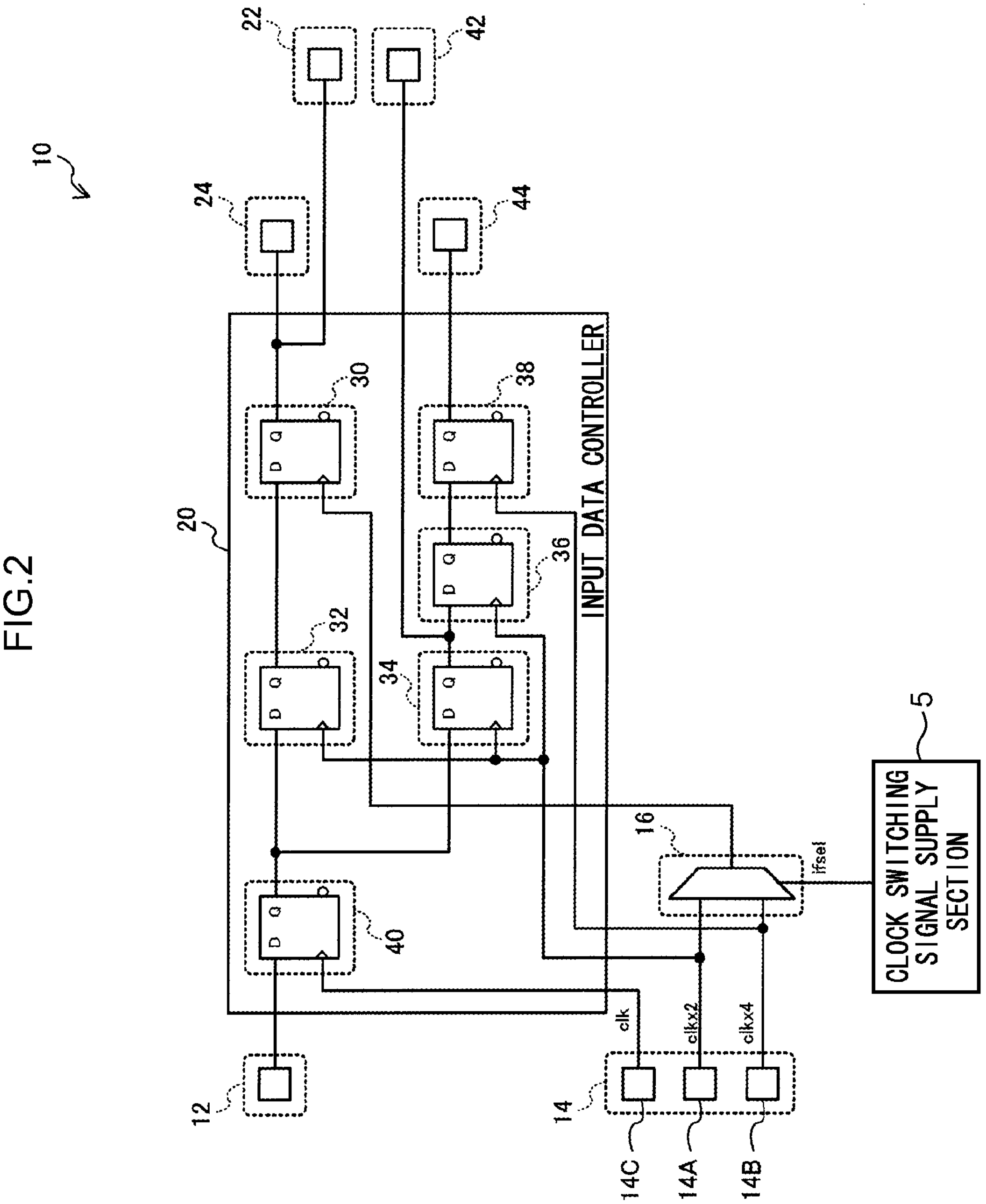
FIG. 2 is a circuit diagram of the semiconductor device schematically illustrated in FIG. 1.

FIG. 2 is a circuit diagram of the semiconductor device that is schematically illustrated in FIG. 1. The clock signal supply section 14 of the semiconductor device 10 illustrated in FIG. 2 supplies the input data controller 20 with a clock signal clk at a specific frequency, a clock signal clkx2 at half the specific frequency, and a clock signal clkx4 at a quarter of the specific frequency. The clock signal clk supplied from a clock signal supply section 14C is directly supplied to the input data controller 20. The clock signal clkx2 supplied from the clock signal supply section 14A is directly supplied to the input data controller 20, and is also supplied to the input data controller 20 through the selector 16. The clock signal clkx4 supplied from the clock signal supply section 14B is directly supplied to the input data controller 20, and also supplied to the input data controller 20 through the selector 16. Note that the clock signal clkx2 and the clock signal clkx4 may be generated by frequency-dividing the clock signal clk.

The input data controller 20 of the semiconductor device 10 illustrated in FIG. 2 includes the first output section 30, a first data holding section 32, a second output section 34, a second data holding section 36, a third output section 38, and a first data latch 40. As illustrated in FIG. 2, the first output section 30, the first data holding section 32, the second output section 34, the second data holding section 36, the third output section 38, and the first data latch 40 of the present exemplary embodiment employ D flip flop circuits.

The first data latch 40 loads an input signal input from the input terminal 12 at a timing corresponding to the clock signal clk, and outputs the loaded signal.

The signal output from the first data latch 40 is input to the first data holding section 32 and the second output section 34. The first data holding section 32 loads the signal input from the first data latch 40 at a timing corresponding to the falling edge of the clock signal clkx2, and outputs the loaded signal. The signal output from the first data holding section 32 is input to the first output section 30. The first output section 30 loads the signal input from the first data holding section 32 at a timing corresponding to the clock signal clkx2, or to the clock signal clkx4, input through the selector 16, and outputs the loaded signal.

When the differential input format input signal input from the input terminal 12 is a first signal (for example, a signal corresponding to an RSDS format), the selector 16 selects the clock signal clkx2, and supplies the clock signal clkx2 to the first output section 30 according to an instruction (switching signal ifsel) of the clock switching signal supply section 5. When the differential input format input signal input from the input terminal 12 is a second signal (for example, a signal corresponding to a mini-LVDS format), the selector 16 selects the clock signal clkx4, and supplies the clock signal clkx4 to the first output section 30 according to instruction (switching signal ifsel) of the clock switching signal supply section 5. The signal loaded by the first output section 30 according to the clock signal clkx2 is output to a later stage circuit of the semiconductor device 10 through the first output terminal 22. The signal loaded by the first output section 30 according to the clock signal clkx4 is output to a later stage circuit of the semiconductor device 10 through the second output terminal 24.

The second output section 34 loads the signal input from the first data latch 40 at a timing corresponding to the rising edge of the clock signal clkx2, and outputs the loaded signal. The signals output from the second output section 34 are output to a later stage circuit of the semiconductor device 10 through a third output terminal 42, as well as being input to the second data holding section 36.

The second data holding section 36 loads the signal input from the second output section 34 at a timing corresponding to the clock signal clkx2, and outputs the loaded signal. The signal output from the second data holding section 36 are input to the third output section 38. The third output section 38 loads the signal input from the second data holding section 36 at a timing corresponding to the clock signal clkx4, and outputs the loaded signal. The signals output from the third output section 38 are output to a later stage circuit of the semiconductor device 10 through a fourth output terminal 44.

When the semiconductor device 10 illustrated in FIG. 2 functions as an interface corresponding to a first input signal, the clock signal clkx2 is supplied from the selector 16 to the input data controller 20. The semiconductor device 10 outputs the input signals loaded according to the clock signal clkx2 to a later stage circuit through the first output terminal 22 and the third output terminal 42. Moreover, when the semiconductor device 10 functions as an interface corresponding to a second input signal, the clock signal clkx4 is supplied from the selector 16 to the input data controller 20. The semiconductor device 10 outputs the input signals loaded corresponding to the clock signal clkx4 to a later stage circuit through the second output terminal 24 and the fourth output terminal 44.

Explanation follows regarding a specific example of the semiconductor device 10 of the present exemplary embodiment.

[First Exemplary Embodiment]

As a specific example of the present exemplary embodiment, explanation is given regarding a case in which one input signal out of an input signal corresponding to an RSDS format and an input signal corresponding to a mini-LVDS format is input, and the semiconductor device 10 functions as either an RSDS interface or a mini-LVDS interface. When functioning as an RSDS interface, the semiconductor device 10 functions as a circuit that latches two sets worth of 2-bit data. When functioning as a mini-LVDS interface, the semiconductor device 10 functions as a circuit that latches one set worth of 8-bit data.

Figure 3:
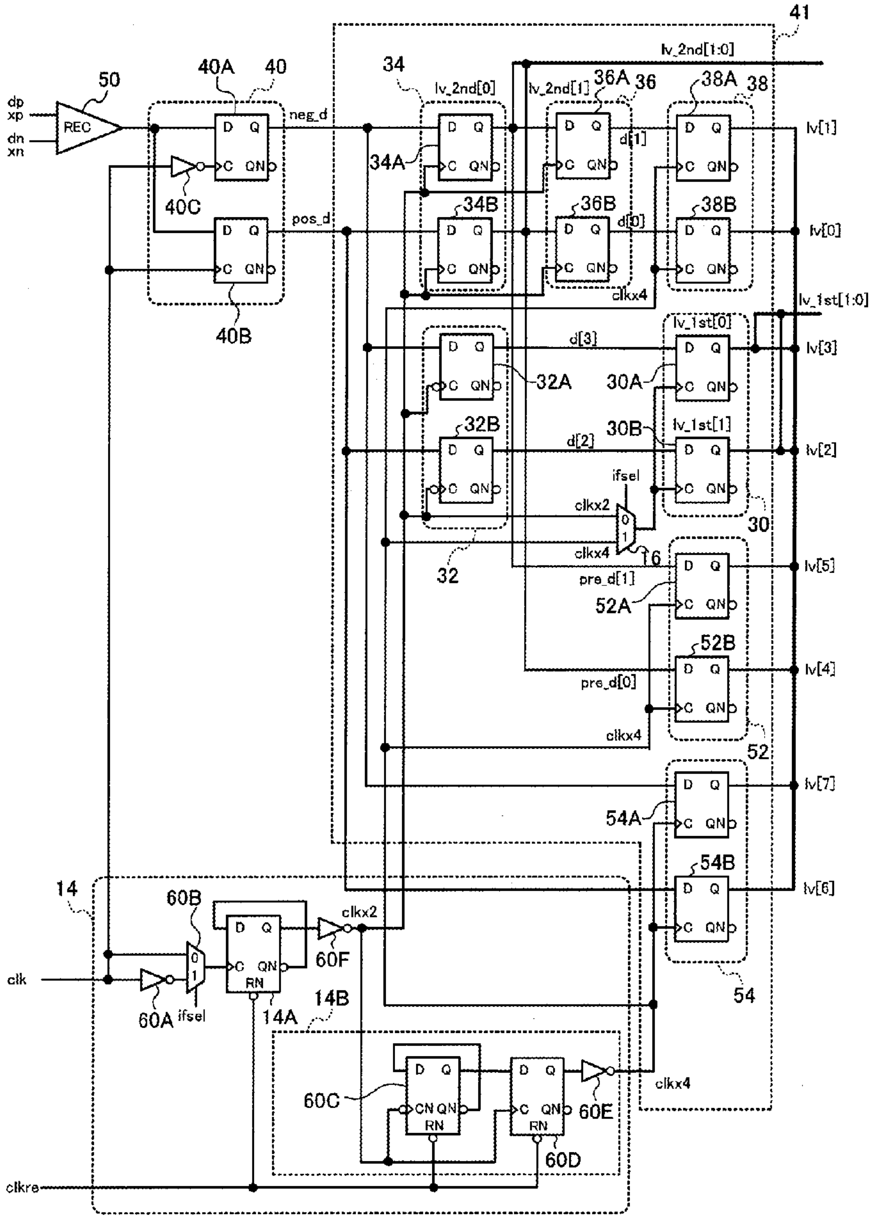
FIG. 3 is a circuit diagram illustrating a semiconductor device of a first exemplary embodiment.

FIG. 3 illustrates a circuit as an example of the semiconductor device 10 of the present exemplary embodiment. Note that in FIG. 3, in the interests of simplicity, the clock switching signal supply section 5, the first output terminal 22, the second output terminal 24, the third output terminal 42, and the fourth output terminal 44 are omitted from illustration.

The clock signal supply section 14 includes the clock signal supply section 14A configured from a D flip flop circuit that frequency-divides the specific clock signal clk by 2, the clock signal supply section 14B that frequency-divides the clock signal clk by 4, an inverter 60A, a selector 60B, and an inverter 60F. The clock signal supply section 14B includes D flip flop circuits 60C, 60D and an inverter 60E. Note that, in the clock signal supply section 14 of the semiconductor device 10 illustrated in FIG. 3, a clock signal supply section 14C is not provided, since the externally supplied clock signal clk is supplied to the input data controller 20. However, when the externally supplied clock signal differs from the clock signal clk, a clock signal supply section 14C is provided so as to generate, and supply to the input data controller 20, the clock signal clk based on the externally supplied clock signal.

The specific clock signal clk input to the clock signal supply section 14, and a signal that is the specific clock signal clk inverted by the inverter 60A are input to the selector 60B. When the semiconductor device 10 is functioning as an RSDS interface due to the clock switching signal ifsel supplied from the clock switching signal supply section 5, the selector 60B outputs the clock signal clk to the clock signal supply section 14A. When the semiconductor device 10 is functioning as a mini-LVDS interface due to the clock switching signal ifsel supplied from the clock switching signal supply section 5, the selector 60B outputs an inverted signal of the clock signal clk to the clock signal supply section 14A. The clock signal supply section 14A generates the clock signal clkx2 with a frequency half that of the specific clock signal clk by loading its own QN output at a timing according to the clock signal clk or the inverted signal thereof, which is then output through the inverter 60F, and outputs the clock signal clkx2 to the input data controller 20 (a second data latch 41) and the clock signal supply section 14B.

The D flip flop circuit 60C of the clock signal supply section 14B loads its own QN output at a timing corresponding to the falling edge of the clock signal clkx2, and outputs the loaded QN output to the D flip flop circuit 60D.

The D flip flop circuit 60D loads the Q output of the D flip flop circuit 60C at a timing corresponding to the rising edge of the clock signal clkx2, and outputs the loaded Q output to the second data latch 41 of the input data controller 20 through the inverter 60E. Accordingly, the clock signal supply section 14B generates the clock signal clkx4 that is the clock signal clk frequency-divided by 4, and supplies the clock signal clkx4 to the second data latch 41 of the input data controller 20. Note that the D flip flop circuit of the clock signal supply section 14A, as well as the D flip flop circuits 60C, 60D of the clock signal supply section 14B, generate the clock signal clkx2 and the clock signal clkx4 during the L level interval of a signal clkre. In the present exemplary embodiment, the signal clkre is externally input to the semiconductor device 10 at a specific timing.

A receiver 50 receives RSDS input signals dp, dn, or mini-LVDS input signals xp, xn, that are input to the semiconductor device 10 through the input terminal 12, and outputs the respective signal to the first data latch 40 of the input data controller 20.

The input data controller 20 of the present exemplary embodiment includes the first data latch 40 and the second data latch 41. The first data latch 40 includes D flip flop circuits 40A, 40B and an inverter 40C. The inverter 40C is input with the specific clock signal clk from the clock signal supply section 14. The D flip flop circuits 40A, 40B of the first data latch 40 are input with input signals output from the receiver 50. The D flip flop circuit 40A is input with the inverted signal of the specific clock signal clk. The D flip flop circuit 40B is input with the specific clock signal clk from the clock signal supply section 14. Namely, the first data latch 40 separates and latches the input signal input from the receiver 50 according to the rising edges and falling edges of the clock signal.

The second data latch 41 includes the first output section 30, the first data holding section 32, the second output section 34, the second data holding section 36, the third output section 38, a fourth output section 52, and a fifth output section 54. The second data latch 41 of the present exemplary embodiment includes the selector 16. Note that the selector 16 may be provided externally to the second data latch 41 (the input data controller 20), as mentioned above.

The first data holding section 32 includes D flip flop circuits 32A, 32B. The D flip flop circuit 32A loads an output signal neg_d of the D flip flop circuit 40A at a timing corresponding to the clock signal clkx2, and outputs a signal d [3]. The D flip flop circuit 32B loads an output signal pos_d of the D flip flop circuit 40B at a timing corresponding to the clock signal clkx2, and outputs a signal d [2].

The first data holding section 32 is connected to the first output section 30. The first output section 30 includes D flip flop circuits 30A, 30B. When the semiconductor device 10 is functioning as an RSDS interface according to the clock switching signal ifsel supplied from the clock switching signal supply section 5, the selector 16 selects the clock signal clkx2 and supplies the clock signal clkx2 to the first output section 30. However, when the semiconductor device 10 is functioning as a mini-LVDS interface, the selector 16 selects the clock signal clkx4 and supplies the clock signal clkx4 to the first output section 30.

The D flip flop circuit 30A loads the signal d [3] at a timing corresponding to the clock signal clkx2 or the clock signal clkx4, and outputs the signal d [3]. The D flip flop circuit 30B loads the signal d [2] at a timing corresponding to the clock signal clkx2 or the clock signal clkx4, and outputs the signal d [2]. When the semiconductor device 10 is functioning as an RSDS interface, an output lv_1st [1:0] of the first output section 30 is output to a later stage circuit through the first output terminal 22. However, when the semiconductor device 10 is functioning as a mini-LVDS interface, the output of the first output section 30 is output to a later stage circuit through the second output terminal 24 as lv [2] or lv [3].

The second output section 34 includes D flip flop circuits 34A, 34B. The D flip flop circuit 34A loads the output signal neg_d of the D flip flop circuit 40A at a timing corresponding to the clock signal clkx2, and outputs a signal pre_d [1]. The D flip flop circuit 34B loads the output signal pos_d of the D flip flop circuit 40B at a timing corresponding to the clock signal clkx2, and outputs a signal pre_d [0]. When the semiconductor device 10 is functioning as a RSDS interface, an output lv_2nd [1:0] of the second output section 34 is output to a later stage circuit through the third output terminal 42.

The second output section 34 is connected to the second data holding section 36. The second data holding section 36 includes D flip flop circuits 36A, 36B. The D flip flop circuit 36A loads the signal pre_d [1] at a timing corresponding to the clock signal clkx2, and outputs a signal d [1]. The D flip flop circuit 36B loads the signal pre_d [0] at a timing corresponding to the clock signal clkx2, and outputs a signal d [0].

The second data holding section 36 is connected to the third output section 38. The third output section 38 includes D flip flop circuits 38A, 38B. The D flip flop circuit 38A loads the signal d [1] at a timing corresponding to the clock signal clkx4, and outputs the loaded signal. The D flip flop circuit 38B loads the signal d [0] at a timing corresponding to the clock signal clkx4, and outputs the loaded signal. When the semiconductor device 10 is functioning as a mini-LVDS interface, the output of the third output section 38 is output to a later stage circuit through the fourth output terminal 44 as lv [1], lv [0].

The fourth output section 52 includes D flip flop circuits 52A, 52B. The D flip flop circuit 52A loads and outputting the signal pre_d [1] at a timing corresponding to the clock signal clkx4. The D flip flop circuit 52B loads the signal pre_d [0] at a timing corresponding to the clock signal clkx4, and outputs the loaded signal. When the semiconductor device 10 is functioning as a mini-LVDS interface, the output of the fourth output section 52 is output to a later stage circuit through a fifth output terminal $62_1$ (see FIG. 4) as lv [4], lv [5].

The fifth output section 54 includes D flip flop circuits 54A, 54B. The D flip flop circuit 54A loads the output signal neg_d at a timing corresponding to the clock signal clkx4, and outputs the loaded signal. The D flip flop circuit 54B loads the output signal pos_d at a timing corresponding to the clock signal clkx4, and outputs the loaded signal. When the semiconductor device 10 is functioning as a mini-LVDS interface, the output of the fifth output section 54 is output to a later stage circuit through a fifth output terminal $64_1$ (see FIG. 4) as lv [6], lv [7].

Figure 4:
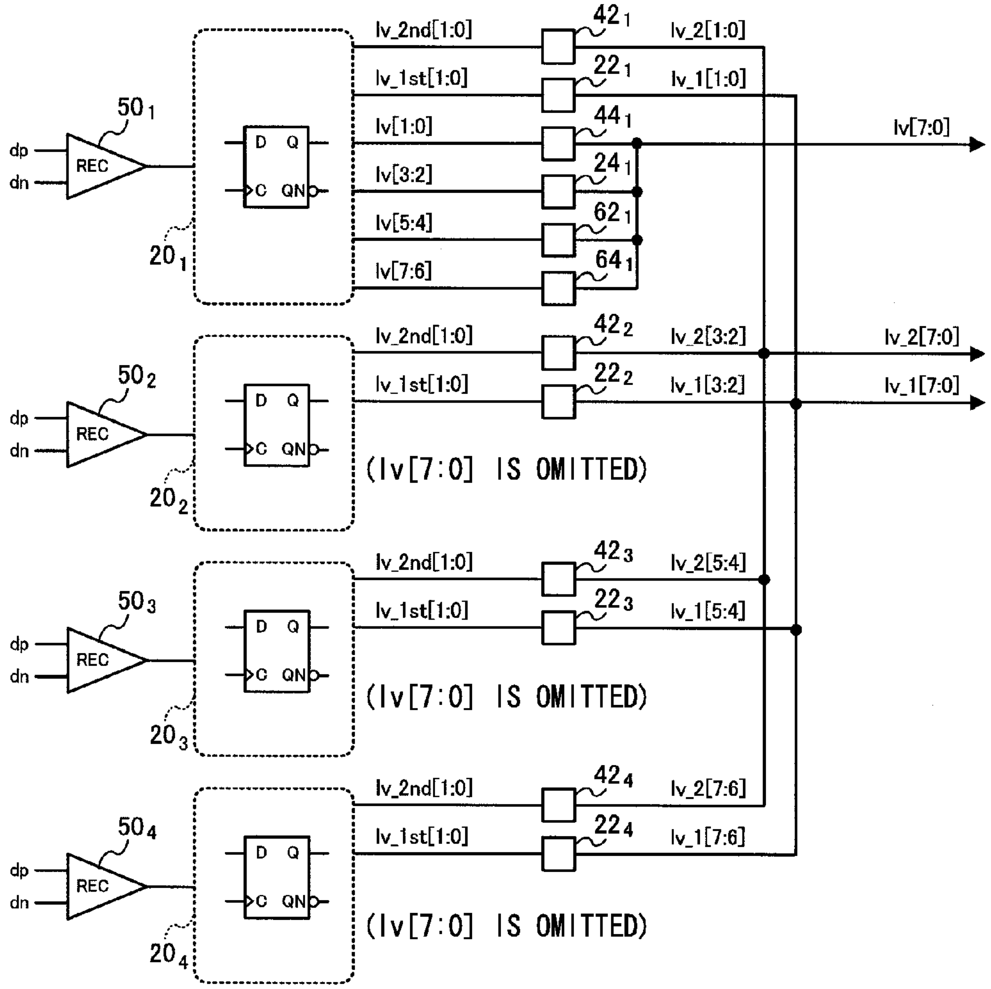
FIG. 4 is a schematic diagram illustrating a configuration for 8-bit data loading in an IC employing a semiconductor device of the first exemplary embodiment as an interface.

As described above, when the semiconductor device 10 of the present exemplary embodiment is functioning as an RSDS interface, the semiconductor device 10 latches two sets worth of 2-bit data (lv_1st [1:0], lv_2nd [1:0]). When the semiconductor device 10 is functioning as a mini-LVDS interface, the semiconductor device 10 latches one set worth of 8-bit data (lv [7:0]). An IC employing the semiconductor device 10 of the present exemplary embodiment as an interface requires a group of four input data controllers 20 in order to load 8-bit data when the input signal is RSDS. FIG. 4 is a schematic diagram of a configuration for 8-bit data loading in an IC employing the semiconductor device 10 of the present exemplary embodiment as an interface.

The IC illustrated in FIG. 4 includes a group of four of the receivers 50 ($50_1$ to $50_4$) and a group of four of the input data controllers 20 ($20_1$ to $20_4$) in order to load an 8-bit RSDS input signal (data). Note that the clock signal supply section 14 may be provided so as to be common to all the four sets of receivers 50 and input data controllers 20. Namely, the IC includes a single clock signal supply section 14 regardless of the number of receiver 50 and input data controller 20 sets.

When the input signal is RSDS, data lv_1 [1:0] output from the input data controller $20_1$ through the first output terminal $22_1$, data lv_1 [3:2] output from the input data controller $20_2$ through the first output terminal $22_2$, data lv_1 [5:4] output from the input data controller $20_3$ through the first output terminal $22_3$, and data lv_1 [7:6] output from the input data controller $20_4$ through the first output terminal $22_4$ are joined together as a bus signal and supplied externally to the semiconductor device 10 as lv_1 [7:0].

Moreover data lv_2 [1:0] output from the input data controller $20_1$ through the first output terminal $42_1$, data lv_2 [3:2] output from the input data controller $20_2$ through the first output terminal $42_2$, data lv_2 [5:4] output from the input data controller $20_3$ through the first output terminal $42_3$, and data lv_2 [7:6] output from the input data controller $20_4$ through the first output terminal $42_4$ are joined together as a bus signal and supplied externally to the semiconductor device 10 as lv_2 [7:0].

In this manner, when an RSDS input signal is input, the four receiver 50 and input data controller 20 sets load two sets worth of 8-bit data.

However, when the input signal is a mini-LVDS, data lv [1:0] output from the input data controller $20_1$ through the fourth output terminal $44_1$, data lv [3:2] output through the second output terminal $24_1$, data lv [5:4] output through the fifth output terminal $62_1$, and data lv [7:6] output through the sixth output terminal $64_1$, are joined together inside the semiconductor device 10 and supplied as lv [7:0].

In this manner, when a mini-LVDS input signal is input, one set of the receiver 50 and the input data controller 20 load one set worth of 8-bit data. Note that, in the IC of the present exemplary embodiment, two sets out of the four receiver 50 and input data controller 20 sets are driven in order to load two sets worth of data, in cases in which an RSDS input signal is input. For example, the receiver $50_1$ and the input data controller $20_1$ and the receiver $50_2$ and the input data controller $20_2$ are respectively driven to load two sets worth of input signals. In such a case, power supply may be cut to the other receivers 50 ($50_3$, $50_4$) and the input data controllers 20 ($20_3$, $20_4$) of the two sets that are not used (driven), thereby a power saving may be achieved.

Figure 5:
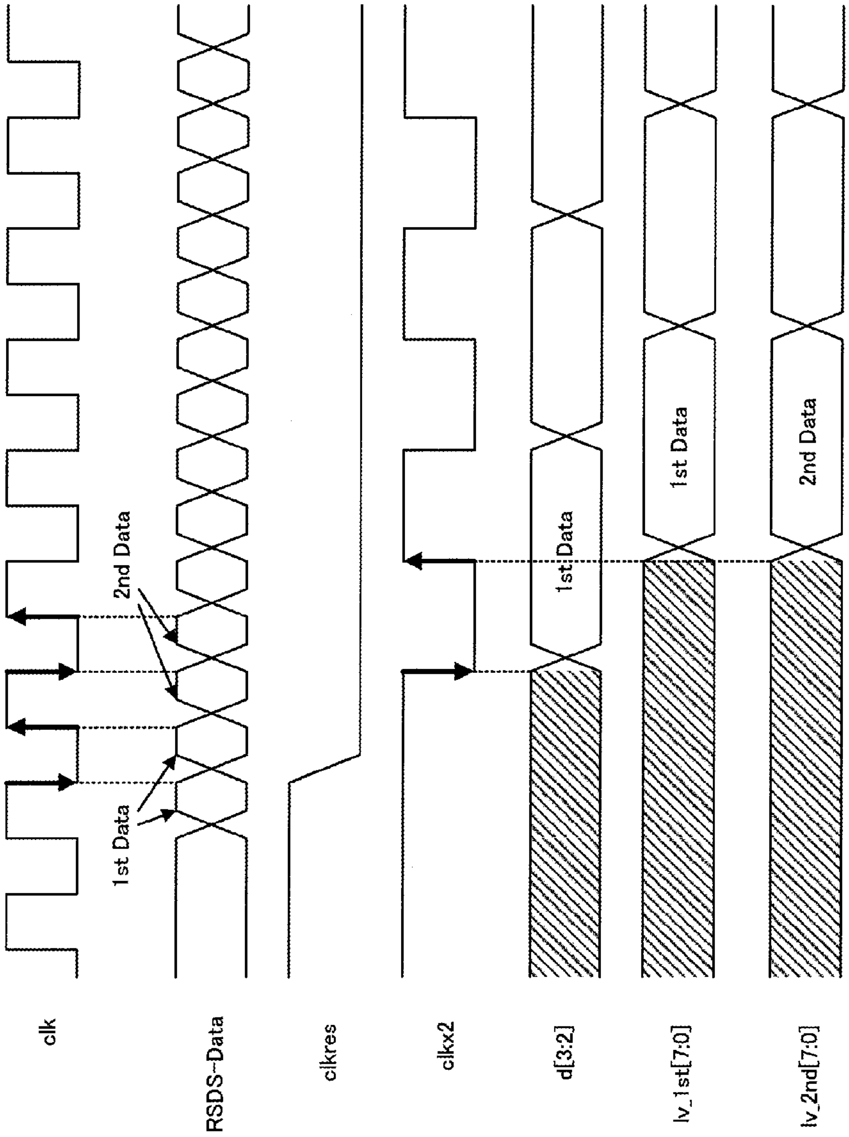
FIG. 5 is a time chart illustrating operation in a case in which a semiconductor device of the first exemplary embodiment is functioning as an RSDS interface.

Explanation follows regarding operation of the semiconductor device 10 of the present exemplary embodiment. Firstly, explanation is given regarding operation when the semiconductor device 10 is functioning as an RSDS interface. FIG. 5 is a time chart of an example of operation when the semiconductor device 10 is functioning as an RSDS interface. When the semiconductor device 10 is functioning as an RSDS interface, the selector 16 selects the clock signal clkx2 and outputs the clock signal clkx2 to the first output section 30 according to the switching signal ifsel supplied from the clock switching signal supply section 5. When functioning as an RSDS interface, the semiconductor device 10 does not employ the clock signal clkx4, generated by frequency-dividing the clock signal generated by the clock generation circuit 60 by 4. The clock signal clkx4 is therefore omitted from illustration in the time chart of FIG. 5.

The first data latch 40 latches 2 bits worth of input signals (RSDS-Data) input from the receiver 50 corresponding to the rising edges and falling edges of the clock signal clk supplied from the clock signal supply section 14.

The first data holding section 32 latches one set worth of input signal (1st Data) on the falling edge of the clock signal clkx2 (see d [3:2] in FIG. 5). The first output section 30 then latches the signal 1st Data output from the first data holding section 32 on the rising edge of the clock signal clkx2 and outputs lv_1st [1:0]. lv_1st [7:0], carrying eight bits worth of data, is output from the first output section 30 by employing the group of four input data controllers 20.

The second output section 34 latches signal 2nd Data that is output from the first data latch 40 on the rising edge of the clock signal clkx2, and outputs lv_2nd [1:0]. lv_2nd [7:0], carrying eight bits worth of data, is output from the second output section 34 by employing the group of four input data controllers 20.

Figure 6:
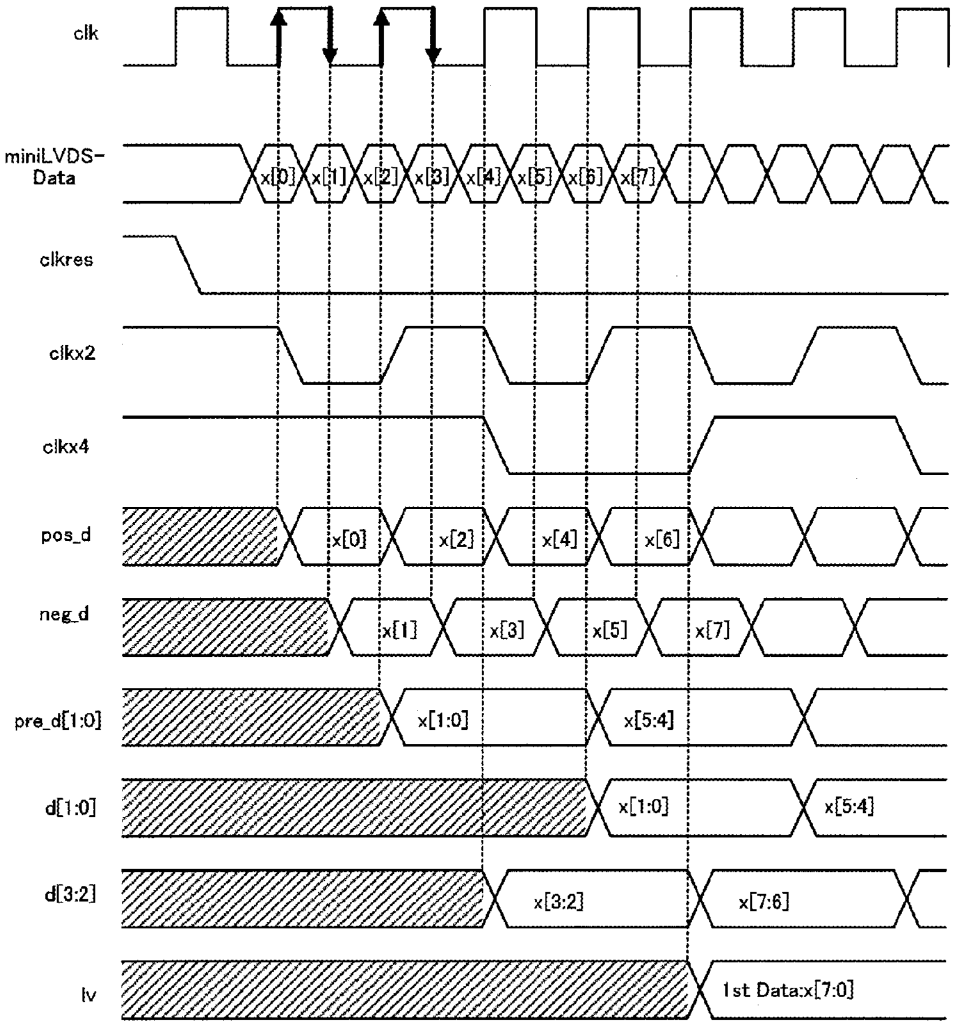
FIG. 6 is a time chart illustrating operation in a case in which a semiconductor device of the first exemplary embodiment is functioning as a mini-LVDS interface.

Next, explanation is given regarding operation when the semiconductor device 10 is functioning as a mini-LVDS interface. FIG. 6 is a time chart of an example of operation when the semiconductor device 10 is functioning as a mini-LVDS interface. When the semiconductor device 10 is functioning as a mini-LVDS interface, the selector 16 selects the clock signal clkx4 and outputs the clock signal clkx4 to the first output section 30 according to the switching signal ifsel supplied from the clock switching signal supply section 5.

The first data latch 40 latches two bits worth of input signals (miniLVDS-Data) input from the receiver 50 according to the rising edges and falling edges of the clock signal clk supplied from the clock signal supply section 14. Data latched corresponding to the rising edges of the clock signal clk (x [0], x [2], x [4], x [6]) is output from the D flip flop circuit 40B as the signal pos_d. Data latched corresponding to the falling edges of the clock signal clk (x [1], x [3], x [5], x [7]) is output from the D flip flop circuit 40A as the signal neg_d.

The second output section 34 latches the signal pos_d and the signal neg_d at a timing corresponding to the rising edges of the clock signal clkx2, and outputs the signal pre_d [1:0] (x [1:0], x [5:4]). The second data holding section 36 then latches the signal pre_d [1:0] at a timing corresponding to the falling edges of the clock signal clkx2, and outputs signal d [1:0] (x [1:0], x [5:4]).

The first data holding section 32 latches the signal pos_d and the signal neg_d at a timing corresponding to the falling edges of the clock signal clkx2, and outputs signal d [3:2] (x [3:2], x [7:6]).

When the semiconductor device 10 is functioning as a mini-LVDS interface, the first output section 30, the third output section 38, the fourth output section 52, and the fifth output section 54 are supplied with the clock signal clkx4 from the clock signal supply section 14. The first output section 30, the third output section 38, the fourth output section 52, and the fifth output section 54 accordingly latch the respective input signals corresponding to the rising edges of the clock signal clkx4, and output the latched signals.

In this manner, the one set's worth of 8-bit data latched by the second data latch 41 is output from the semiconductor device 10 to a later stage circuit as 1st Data (x [7:0]).

[Comparative Example RSDS Interface]

Figure 8:
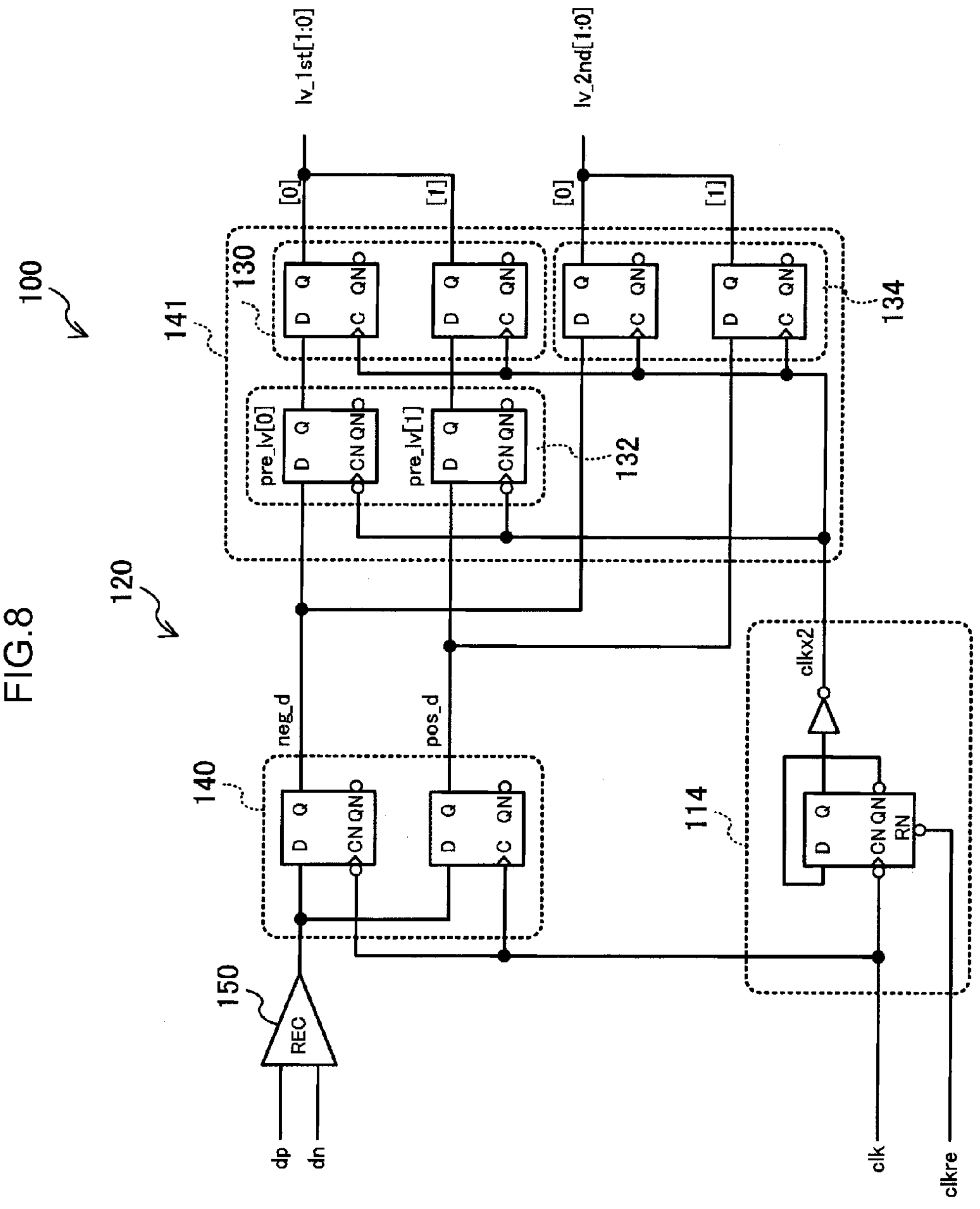
FIG. 8 is a circuit diagram of an RSDS interface (semiconductor device) of a Comparative Example.

Explanation follows regarding a related semiconductor device that functions as an RSDS interface as a Comparative Example to the semiconductor device 10 of the present exemplary embodiment. FIG. 8 is a circuit diagram of a semiconductor device 100 of the Comparative Example. The semiconductor device 100 of the Comparative Example includes a receiver 150, an input data controller 120, and a clock signal supply section 114. The input data controller 120 includes a first data latch 140 and a second data latch 141.

The receiver 150 and the first data latch 140 are similar in configuration to the receiver 50 and the first data latch 40 of the semiconductor device 10 of the first exemplary embodiment.

The clock signal supply section 114 includes a D flip flop circuit and an inverter, and generates clock signal clkx2 that is a clock signal clk frequency-divided by 2, and supplies the clock signal clkx2 to the second data latch 141.

The second data latch 141 includes a first output section 130, a first data holding section 132, and a second output section 134. The first output section 130, the first data holding section 132 and the second output section 134 are each equipped with two D flip flop circuits. The first output section 130, the first data holding section 132, and the second output section 134 each loads the signal according to the clock signal clkx2 and outputs the loaded signal.

Figure 9:
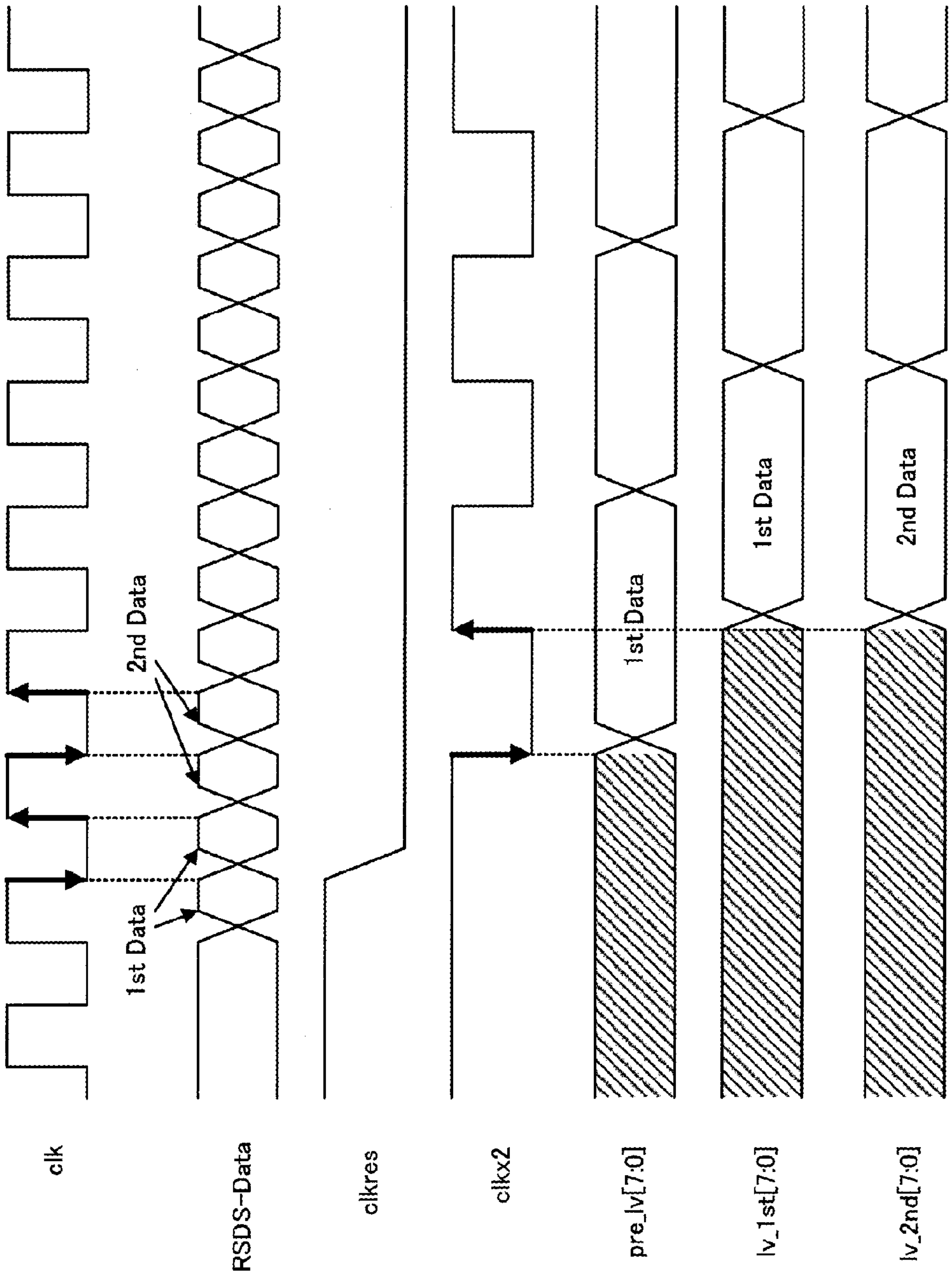
FIG. 9 is a time chart illustrating operation of the RSDS interface of the Comparative Example.

FIG. 9 is a time chart illustrating operation of the semiconductor device 100 of the Comparative Example.

The first data latch 140 latches 2 bits worth of input signals (RSDS-Data) input from the receiver 150 corresponding to the rising edges and falling edges of the clock signal clk supplied from the clock signal supply section 114.

The data latched by the first data latch 140 can be loaded by the second data latch 141 at a timing corresponding to the rising edges and falling edges of the clock signal clkx2 to latch two sets worth of 2-bit data (lv_1st [1:0], lv_2nd [1:0]).

A group of four semiconductor devices 100 can load two sets worth of 8-bit data (lv_1st [7:0], lv_2nd [7:0]), similarly to the semiconductor device 10 of the first exemplary embodiment.

In this manner, a group of 12 of the related semiconductor devices 100 can latch six sets worth of 8-bit data.

[Comparative Example Mini-LVDS Interface]

Figure 10:
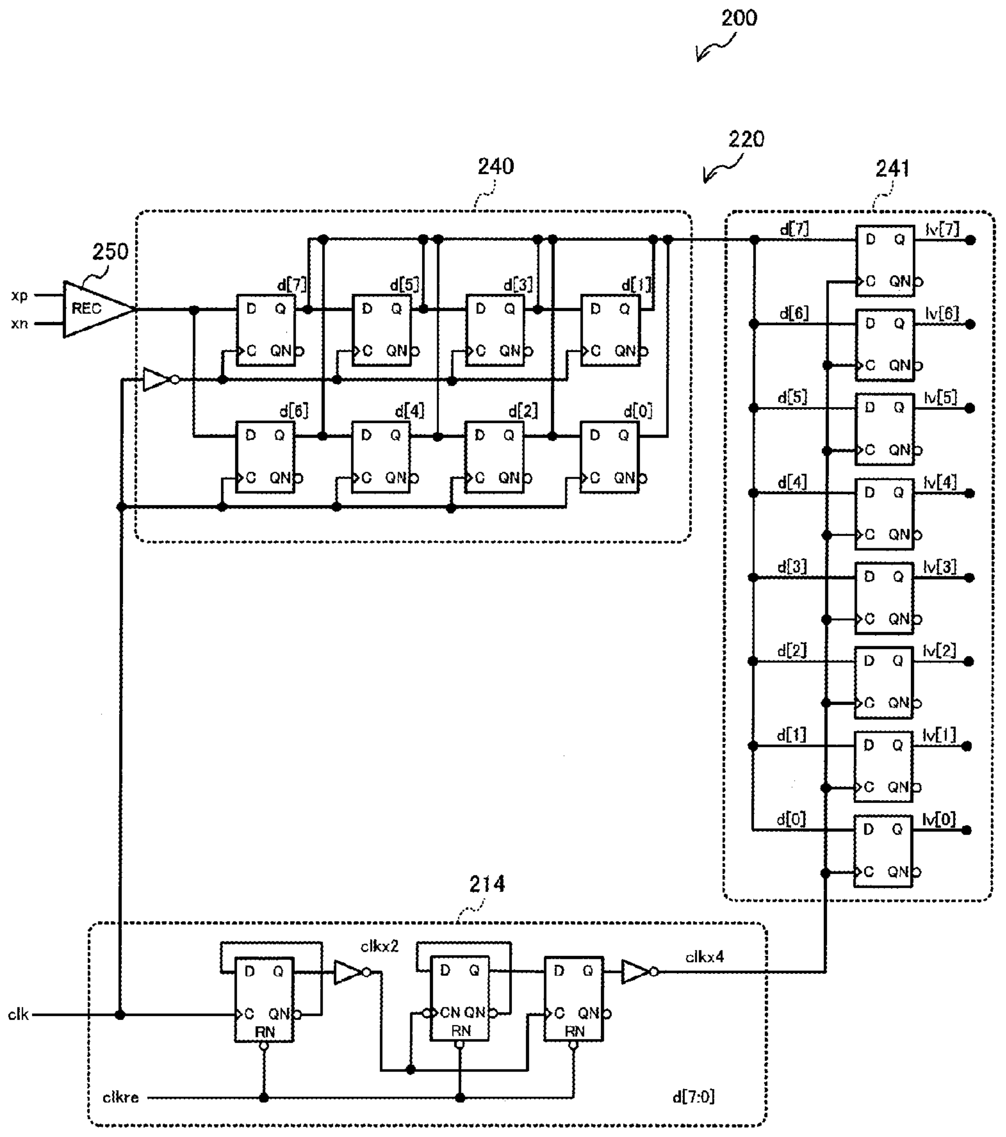
FIG. 10 is a circuit diagram of a mini-LVDS interface (semiconductor device) of a Comparative Example.

Explanation follows regarding a related semiconductor device that functions as a mini-LVDS interface as a Comparative Example to the semiconductor device 10 of the present exemplary embodiment. FIG. 10 is a circuit diagram of a semiconductor device 200 of the Comparative Example. The semiconductor device 200 of the Comparative Example includes a receiver 250, an input data controller 220 and a clock signal supply section 214. The input data controller 220 includes a first data latch 240 and a second data latch 241.

The receiver 250 is similar in configuration to the receiver 50 of the semiconductor device 10 of the first exemplary embodiment.

The clock signal supply section 214 includes three D flip flop circuits and two inverters, and generates the clock signal clkx4 with a frequency one quarter that of the clock signal clk based on the clock signals clk, clkx2, and supplies the clock signal clkx4 to the second data latch 241.

The first data latch 240 includes one D flip flop circuit per bit, and is accordingly equipped with eight D flip flop circuits.

The second data latch 241 includes eight D flip flop circuits. Each of the eight D flip flop circuits loads the signal output from the first data latch 240 according to the clock signal clkx4, and outputs the loaded signal.

Figure 11:
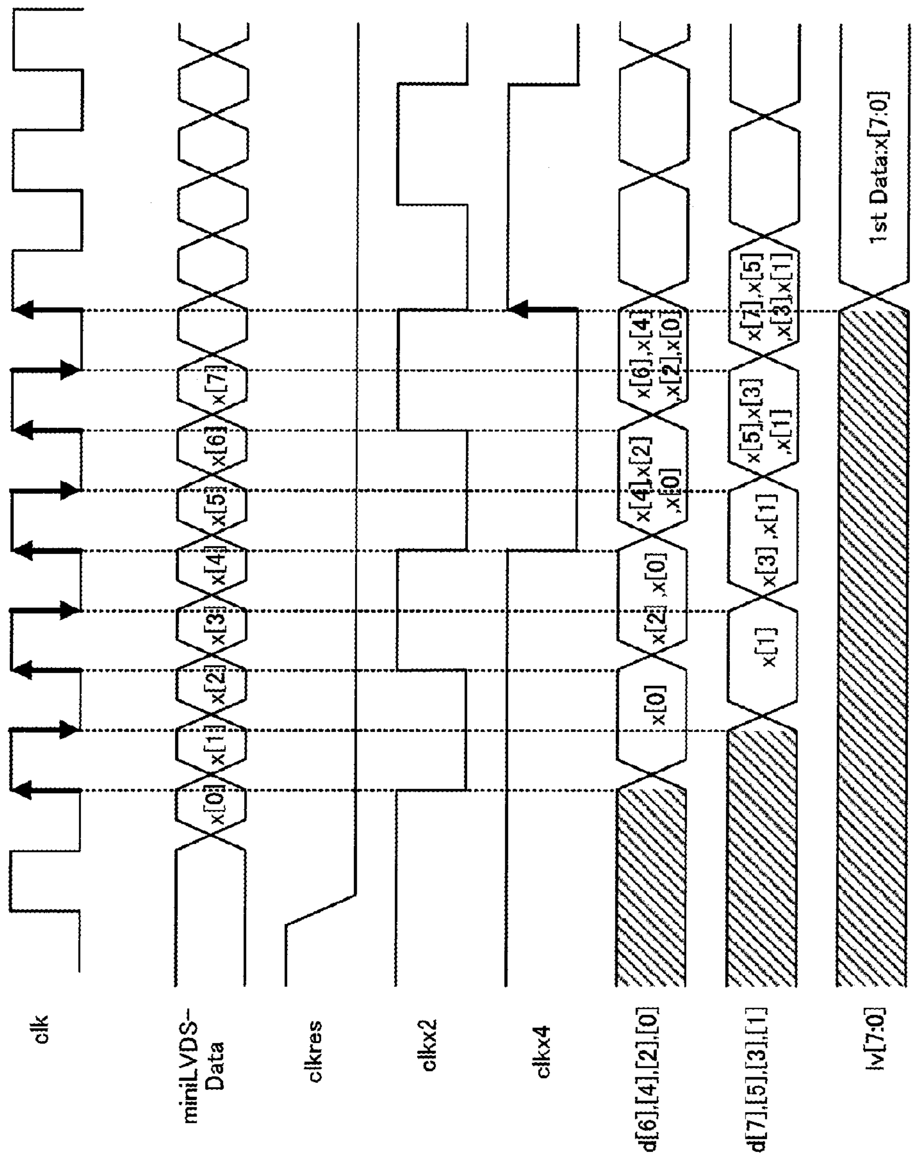
FIG. 11 is a time chart illustrating operation of the mini-LVDS interface of the Comparative Example.

FIG. 11 is a time chart illustrating operation of the semiconductor device 200 of the Comparative Example.

The first data latch 240 latches four bits of input signals (miniLVDS-Data) input from the receiver 250 on the rising edge and four bits on the falling edge of the clock signal clk, supplied from the clock signal supply section 114, to latch a total of eight bits of data.

The eight bits worth of data latched by the first data latch 240 are loaded by the second data latch 241 at a timing corresponding to the rising edge of the clock signal clkx4, enabling one set's worth of 8-bit data (lv [7:0]) to be latched.

In this manner, a group of 6 of the related semiconductor devices 200 can latch six sets of 8-bit data.

[Second Exemplary Embodiment]

In the present exemplary embodiment, explanation is given regarding a case in which the semiconductor device 10 of the first exemplary embodiment is applied as an interface for a drive IC of a display device.

Figure 7:
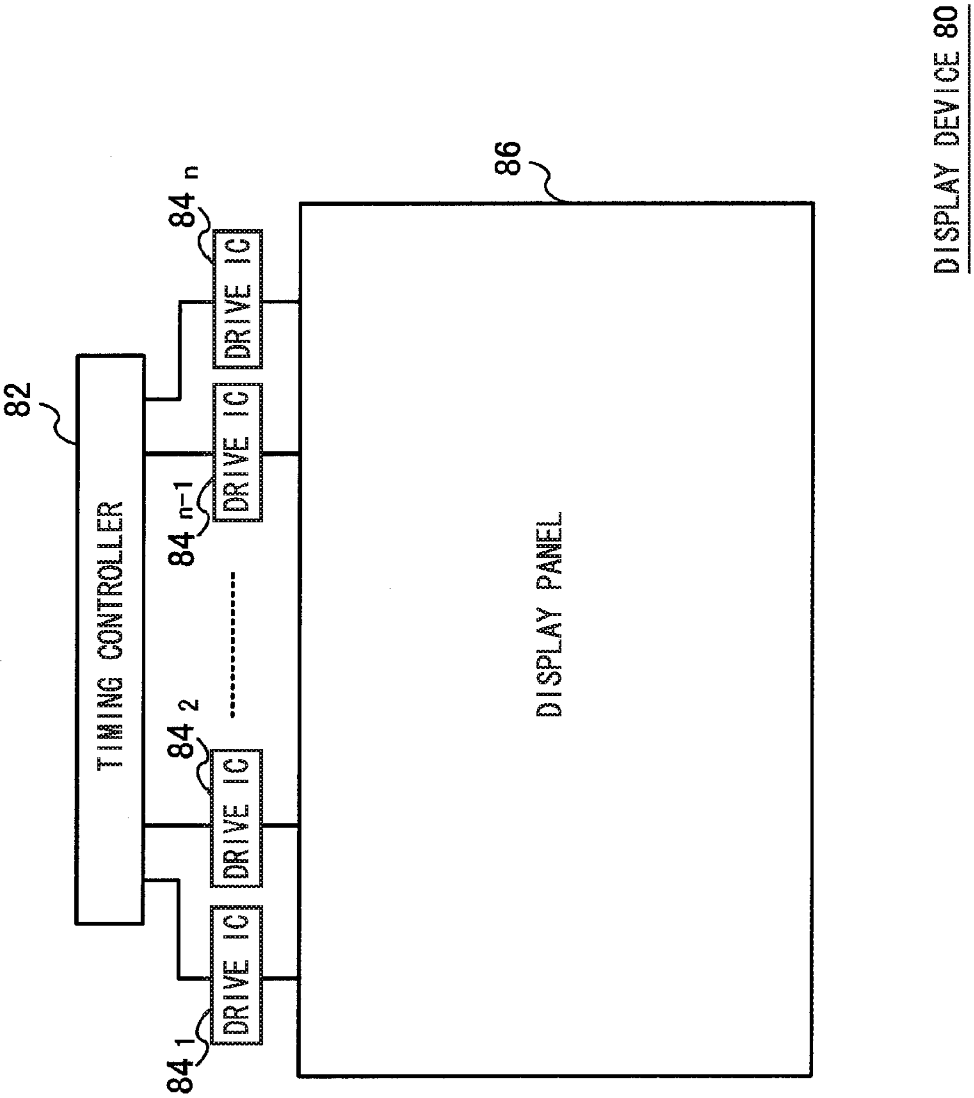
FIG. 7 is a configuration diagram illustrating configuration of a display device of a second exemplary embodiment.

FIG. 7 is a configuration diagram illustrating an example of a display device of the present exemplary embodiment. As illustrated in FIG. 7, a display device 80 of the present exemplary embodiment includes a timing controller 82, n drive ICs 84 (84$_1$ to 84$_n$) and a display panel 86.

A liquid crystal display is an example of the display panel 86.

Data signals and control signals for displaying an image on the display panel 86 are input from the timing controller 82 to each drive IC 84. Each drive IC 84 is installed with the semiconductor device 10 described in the first exemplary embodiment. In each of the drive ICs 84 the semiconductor device 10 functions as an interface, thereby enabling the data signals and control signals to be loaded from the timing controller 82. Accordingly, each of the drive ICs 84 of the present exemplary embodiment is capable of loading both RSDS differential input signals and mini-LVDS differential input signals. Each of the drive ICs 84 performs specific processing using later stage circuits (not illustrated in the drawings) of the semiconductor device 10 based on the signal loaded from the timing controller 82, and outputs to signal lines of the display panel 86.

Since the drive ICs 84 in the display device 80 of the present exemplary embodiment accordingly are capable of loading both RSDS differential input signals and mini-LVDS differential input signals, the output differential input signals of the timing controller 82 can be loaded as appropriate regardless of whether they are in an RSDS or a mini-LVDS format.

The present exemplary embodiment accordingly eliminates the need to redesign the drive IC 84 for each signal (signal format) that is output from the timing controller 82, eliminating the need for a lengthy development process and redesign costs being incurred.

As described above, the semiconductor device 10 of the above exemplary embodiment includes the receiver 50, the clock signal supply section 14, and the input data controller 20. The input data controller 20 includes the first data latch 40 and the second data latch 41. The first data latch 40 includes two D flip flop circuits. The second data latch 41 includes 14 D flip flop circuits and the selector 16.

Namely, the semiconductor device 10 can function as a mini-LVDS interface by adding flip flop circuits (the fourth output section 52, the fifth output section 54) and the selector 16 to the related semiconductor device 100 that functions as an RSDS interface.

When the semiconductor device 10 is functioning as an RSDS interface, the semiconductor device 10 uses the first data latch 40 to latch 2-bit input signal data received by the receiver 50 segmented between the rising edges and the falling edges of the clock signal clk. The second data latch 41 uses the first output section 30, the first data holding section 32, and the second output section 34 to latch two sets worth of 2-bit data corresponding to the rising edges and the falling edges of the clock signal clkx2.

When the semiconductor device 10 is functioning as a mini-LVDS interface, the semiconductor device 10 uses the first data latch 40 to latch 2-bit input signal data received by the receiver 50 segmented between the rising edges and the falling edges of the clock signal clk. The second data latch 41 uses the first data holding section 32 and the second output section 34 to hold four clock cycle worth of signals neg_d, pos_d output from the first data latch 40 corresponding to the rising edges and the falling edges of the clock signal clkx2. The second data latch 41 then uses the first output section 30, the third output section 38, the fourth output section 52 and the fifth output section 54 to latch one set's worth of 8-bit data corresponding to the rising edges of the clock signal clkx4.

The semiconductor device 10 is accordingly able to function as an interface accommodating different differential formats (RSDS format and mini-LVDS format).

Explanation follows regarding a case in which six sets worth of 8-bit data are latched by way of a specific example. In related ICs (such as the drive IC 84), a group of 12 of the RSDS interface semiconductor devices 100 (input data controllers 120) is required, and a group of six of the mini-LVDS interface semiconductor devices 200 (input data controllers 220) is required. The number of D flip flop circuits required in the input data controllers 120, 220 therefore totals 12×groups of 8+6×groups of 16=96+96=192 D flip flop circuits.

In contrast thereto, in an IC (such as the drive IC 84) applied with the semiconductor device 10 of the present exemplary embodiment, it is sufficient to provide, as an RSDS interface, a group of six of the semiconductor devices 10 (the input data controllers 20) configured as in the present embodiment, and a group of six of the semiconductor device 100 (input data controller 120). The number of D flip flop circuits required in the input data controllers 20, 120 therefore totals 6×groups of 16+6×groups of 8=96+48=144 D flip flop circuits. Accordingly, employing the semiconductor device 10 of the present exemplary embodiment may enable a reduction in the number of D flip flop circuits, and thus, may suppress an increase in circuit surface area.

In the input data controller 220 of the mini-LVDS interface semiconductor device 200, eight D flip flop circuits operate according to clock signal clk. In contrast, in the input data controller 20 of the semiconductor device 10 of the present exemplary embodiment, two D flip flop circuits (the first data latch 40) operate according to the clock signal clk, and six D flip flop circuits (the first data holding section 32, the second output section 34, and the second data holding section 36) operate under the clock signal clkx2. Accordingly, the current consumption of the input data controller 20 of the semiconductor device 10 may be suppressed since D flip flop circuits operate at a lower frequency than the clock signal clk.

Since an increase in circuit scale may be suppressed in the semiconductor device 10 of the present exemplary embodiment, the circuit surface area may be suppressed as well as enabling signals of different differential formats to be loaded.

Note that in the explanation regarding a specific example in which 6 sets worth of 8-bit data are latched, a group of six of the input data controllers 20 of the semiconductor devices 10 are used to achieve a common RSDS interface and mini-LVDS interface. However, the number (of groups) of the common input data controllers 20 is not limited thereto, and may be determined depending on for example the usage of the IC (such as the drive IC 84).

In each of the exemplary embodiments described above, explanation has been given regarding a case in which the input signals of differential input formats input to the semiconductor device 10 are RSDS input signals and mini-LVDS input signals. However, there is no limitation thereto and configuration may be made with other input signals. Moreover in each of the exemplary embodiments described above explanation has been given regarding a case in which 8-bit data (input signal) are loaded. However, the data bit number is not limited thereto.

Moreover, the configuration and operation of other components including the semiconductor device 10, the clock signal supply section 14, the input data controller 20 and the display device 80 in each of the exemplary embodiments described above are merely examples thereof, and obviously modifications are possible thereto, within a range that does not depart from the spirit of the present invention.

What is claimed is:

1. A drive IC that outputs to a display panel a signal generated based on image data, the drive IC comprising:

a clock signal supply section configured to supply a plurality of clock signals;

an input terminal that has as an input a first differential signal or a second differential signal as input data;

a first output section configured to output the input data that has been input through the input terminal, according to a clock signal supplied from the clock signal supply section;

an input data controller that includes the first output section and that is configured to control loading of the input data;

a first output terminal that is connected to the first output section and that outputs a signal corresponding to the first differential signal;

a second output terminal that is connected to the first output section and that outputs a signal corresponding to the second differential signal; and a selector that is configured, based on a switching signal from a clock switching signal supply section, to select a clock signal corresponding to the first differential signal or the second differential signal from among the plurality of clock signals supplied from the clock signal supply section, and supply the selected clock signal to the first output section as the clock signal.

2. The drive IC of claim 1, wherein the clock signal supply section is configured to supply the input data controller with a first clock signal and a second clock signal from the plurality of clock signals, the second clock signal having a lower frequency than the first clock signal.

3. The drive IC of claim 2, wherein the selector is configured to select either the first clock signal or the second clock signal supplied from the clock signal supply section as the selected clock signal.

4. The drive IC of claim 2, wherein the first output section is configured to hold the input data according to one transition of a level of the first clock signal or the second clock signal supplied from the clock signal supply section, the transition comprising a rising transition to a high level or a falling transition to a low level, and wherein the drive IC further comprises a first data holding section that is connected at a stage prior to the first output section, and that is configured to hold data according to a level transition of the first clock signal that is different than the level transition at which the first output section holds the input data.

5. The drive IC of claim 4, wherein the first data holding section is configured by a flip flop circuit.

6. The drive IC of claim 4, further comprising:

a second data holding section that is supplied with the first clock signal;

a second output section that is configured, according to the first clock signal supplied from the clock signal supply section, to output to the second data holding section another signal corresponding to the second differential signal, and output to a third output terminal another signal corresponding to the first differential signal; and a third output section that is connected to the second data holding section and that is configured to output to a fourth output terminal a further signal corresponding to the second differential signal according to the second clock signal supplied from the clock signal supply section.

7. The drive IC of claim 6, wherein the first output section, the second output section, and the third output section are each configured by a flip flop circuit.

8. The drive IC of claim 6, wherein the second data holding section is configured by a flip flop circuit.

9. The drive IC of claim 6, further comprising:

a fourth output section configured to output to a fifth output terminal a signal that has been output from the second output section, according to the second clock signal supplied from the clock signal supply section.

10. The drive IC of claim 9, further comprising:

a fifth output section configured to output to a sixth output terminal the input data that has been input through the input terminal, according to the second clock signal supplied from the clock signal supply section.

11. The drive IC of claim 1, wherein the first differential signal is a signal based on an RSDS input format.

12. The drive IC of claim 1, wherein the second differential signal is a signal based on a mini-LVDS input format.

13. A display device comprising:

the display panel;

the drive IC of claim 1; and a timing controller that instructs the drive IC regarding input data loading.

14. A signal loading method for a drive IC including a clock signal supply section that supplies a first clock signal and a second clock signal, an input terminal that is input with a first differential signal or a second differential signal as input data, a first output section that outputs the input data that has been input through the input terminal, according to a clock signal supplied from the clock signal supply section, an input data controller that includes the first output section and that controls loading of the input data, a first output terminal that is connected to the first output section and that outputs a signal corresponding to the first differential signal, a second output terminal that is connected to the first output section and that outputs a signal corresponding to the second differential signal, and a selector that based on a switching signal from a clock switching signal supply section selects a clock signal corresponding to the first differential signal or the second differential signal from among the first clock signal and the second clock signal supplied from the clock signal supply section, and supplies the selected clock signal to the first output section as the clock signal, a second output section that, according to the first clock signal supplied, outputs another signal corresponding to the second differential signal to a second data holding section supplied with the first clock signal, and outputs to a third output terminal another signal corresponding to the first differential signal, and a third output section that is connected to the second data holding section and that outputs to a fourth output terminal a further signal corresponding to the second differential signal according to the second clock signal, the loading method comprising:

when the first differential signal has been input to the input terminal, selecting, by the selector, the first clock signal corresponding to the first differential signal, and supplying the first clock signal to the first output section;

outputting, by the first output section, the input data from the first output terminal according to the first clock signal; and outputting, by the second output section, according to the first clock signal, the another signal corresponding to the second differential signal to the second data holding section that is supplied with the first clock signal, and the another signal corresponding to the first differential signal from a third output terminal; and when the second differential signal has been input to the input terminal, selecting, by the selector, the second clock signal corresponding to the second differential signal, and supplying the second clock signal to the first output section;

outputting, by the first output section, the input data from the third output terminal according to the second clock signal; and outputting, by the third output section, a further signal corresponding to the second differential signal from the fourth output terminal according to the second clock signal.

* * * * *